Sept. 23, 1952   A. W. SIMPSON   2,611,793
DRY CELL WITH IMPROVED THERMOPLASTIC SEAL
Filed Sept. 15, 1948
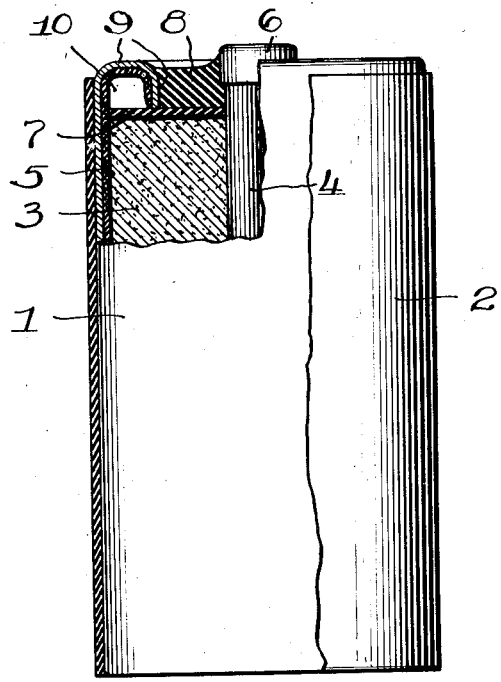
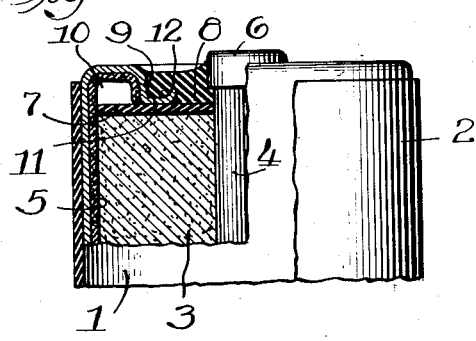
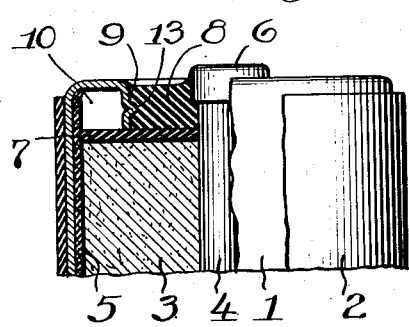
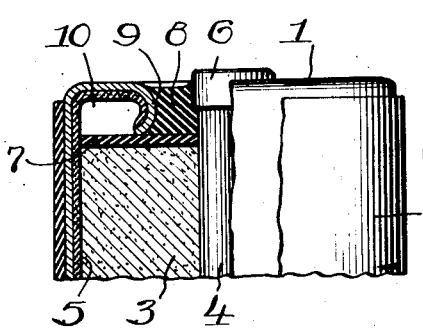
INVENTOR.
Arthur W. Simpson Patented Sept. 23, 1952

2,611,793

UNITED STATES PATENT OFFICE 2,611,793

DRY CELL WITH IMPROVED THERMOPLASTIC SEAL

Arthur W. Simpson, Freeport, Ill., assignor, by mesne assignments, to Burgess Battery Company, Freeport, Ill., a corporation of Delaware Application September 15, 1948, Serial No. 49,322

9 Claims. (Cl. 136—133)

This invention relates to electric dry cells and more particularly to improved means for sealing the tops of cylindrical type, such as flashlight, cells.

The principal object of the invention is to improve the sealing structure of cylindrical cells of the type which depend upon a thermoplastic sealing material for hermetically closing the tops of the cells. This is accomplished principally by reducing the span of the seal, increasing the ratio of depth to span thereof, and providing surfaces to which the sealing material will tenaciously adhere. Increased strength also results from the reinforcing effect of indented and embedded supporting surfaces.

A further object is to provide a simple and compact top assembly for a dry cell wherein a single washer supports the molten sealing material during the sealing procedure and defines an air space surrounding the seal, in addition to its ordinary function of centering the carbon electrodes and confining the cell mix.

In the accompanying drawing,

Fig. 1 is a side view, partly in section, of a cell embodying a simple form of the invention, and Figs. 2 to 4 are fragmentary side views, partly in section, illustrating certain modifications of the invention.

Essentially, the invention contemplates a cell in which the upper portion of the metal can is formed inwardly and turned down to the washer to form a well for the reception of sealing material adjacent the carbon electrode and an expansion space surrounding the well and adjacent the can. Thus, the space above the washer is divided by a circular partition concentric with the carbon and can electrodes into an air space and a sealing space, the latter being considerably smaller than known construction of this type cell.

In one form of modern dry cell, the separating layer lying between the mix and the can electrode is a starchy composition applied by a centrifugal operation which spreads the material in a uniform layer and carries the separating layer to the top edge of the can. This starchy layer does not have sufficient mechanical strength to support and hold a thermoplastic seal formed in the top of the cell in the ordinary manner. Special provision must be made for the sealing of such cells. Furthermore, the starchy layer must itself be completely enclosed by the seal. Because the present invention is particularly useful in the sealing of such cells for the principal reason that it presents a metallic surface to the sealing material for good adhesion and support, the invention is illustrated as embodied in such a cell.

The cell illustrated in Fig. 1 incorporates the usual elements, including a metallic can 1 of zinc, magnesium, or other suitable metal, a cylindrical insulating jacket 2 surrounding the can, and a body 3 of mix surrounding a central carbon terminal 4 and separated from can 1 by a starchy layer 5. A brass cap 6 is pressed upon the upper end of carbon terminal 4 and a washer 7 of suitable non-conducting material, such as impregnated cardboard, is impaled upon carbon 4 and rests upon the mix body. A seal 8 completes and closes the cell.

In producing a cell in accordance with the invention, an extra tall can is employed to allow a portion at the top which can be turned in and down, as and for the purposes herein described. The separating layer is first applied to the interior surfaces of the cell. The mix, carbon terminal, and washer are then inserted and the cell is ready for the sealing operation. To provide the top closure and seal, the portion of the metal can extending above the cell is formed inwardly and then turned down as shown in Fig. 1. In this particular form of the invention, the length of the can is such that it just reaches the washer when the forming operation, described, is completed. In this way, a well is provided between the retroverted end portion of the can, partition 9, and the central terminal of the cell, washer 7 forming the floor of the well.

In so forming the cell, it is desirable to carry the partition 9 as far in toward the center electrode as possible to provide an expansion space 10 of maximum volume and reduce the span of seal 8 to a minimum. The metallic can must, of course, be electrically insulated from terminal 4 and cap 6 to avoid the short circulating of the cell.

Upon completion of the can forming operation, molten sealing material is poured into the well surrounding central terminal 4 to form seal 8. This seal adheres strongly to the can and central terminal surfaces and to the surface of washer 7 and will withstand the substantial pressures that may be built up within the cell by the evolution of gases. Any tendency of mix body 3 to swell presses upwardly upon washer 7, but this load is not borne by the seal alone since the edge of the can engages the washer and the metal structure will oppose such upward movement. Any yielding will be likely to be limited to the peripheral portion of the washer into expansion space 10 and the seal will remain intact.

In the cell illustrated in Fig. 2, the end portion of metallic can 1 is continued inwardly at 11 from partition 9 and a shallow up-turned flange 12 is formed by the portion adjacent the edge of the can. When seal 8 is poured, flange 12 is embedded within the seal and serves to strengthen the seal against radially-directed forces.

The structure of Fig. 3 is similar to that of Fig. 1 except that an additional crimp 13 is formed in the portion of the can which forms partition 9. This crimp extends inwardly toward the center of the cell and is embedded in seal 8, forming a tongue and groove engagement which strengthens the seal in opposing upward pressures within the cell.

The cell of Fig. 4 is also similar to that of Fig. 1 except that the portion of the can which forms partition 9 is curved convex inwardly. In this structure the seal is rigidly secured in position by reason of its gripping configuration as well as the adhesion of the sealing material to the engaging surfaces.

Since the span of any form of seal described is substantially less than that of the known full span seal, its thickness may be reduced and additional space thus gained for active cell materials. Many other configurations of the formed top portions of the cans may be employed without departing from the essential inventive concept herein disclosed. Also, non-conductive cements or setting mastics of various kinds may be used as the full equivalent of the thermoplastic sealing material.

Invention is claimed as follows:

1. In a dry cell, an integral metal can having a top portion and a body portion, a central terminal within said can and exposed at the top of the cell, a flat washer of non-conducting material spaced from the top of the cell and extending radially from said central terminal toward said can, said top portion of said can extending inwardly at the top of the cell to a location intermediate said central terminal and said body portion of said can and thence extending downwardly to said washer, and a body of sealing material upon said washer and confined between said central terminal and the down-turned portion of said top portion of said can in sealing engagement therewith.

2. Structure in accordance with claim 1 wherein the down-turned portion of the can is curved concave inwardly.

3. Structure in accordance with claim 1 wherein the down-turned portion of the can is crimped to form a tongue which is embedded within a corresponding groove in the periphery of the body of sealing material.

4. In a dry cell, an integral metal can having a top portion and a body portion, a central terminal within said can and exposed at the top of the cell, a washer of non-conducting material spaced from the top of the cell and extending radially from said central terminal toward said can, said top portion of said can extending inwardly at the top of the cell to a location intermediate said central terminal and said body portion of said can, thence extending downwardly to engagement with said washer, thence extending inwardly to a location short of said central terminal and thence upwardly to form a shallow flange, and a body of sealing material upon said washer between said central terminal and the down-turned portion of said can and covering said in-turned portion and said flange.

5. A dry cell comprising a cylindrical can, a central rod terminal exposed at the top of the cell, a flat washer extending between said can and terminal and spaced from the top of the cell, the top portion of said can being inwardly retroverted to define with said washer an annular expansion chamber, and sealing material on said washer between the retroverted top portion of said can and said rod terminal in sealing engagement therewith.

6. In a dry cell, an integral metal can having a top portion and a body portion, a central terminal within said can and exposed at the top of the cell, a flat washer of non-conducting material spaced from the top of the cell and extending radially from said central terminal toward said can, said top portion of said can extending inwardly at the top of the cell to a location intermediate said central terminal and said body portion of said can and thence extending downwardly to said washer to form an expansion chamber between said top portion of said can and said washer, and a body of sealing material upon said washer between said central terminal and the down-turned portion of said top portion of said can, the depth of said body of sealing material being approximately equal to the length of said down-turned portion of said top portion of said can.

7. A dry cell comprising a cylindrical can, a central rod terminal exposed at the top of the cell, a body of mix surrounding said central rod terminal, a flat washer resting upon said body of mix and extending between said can and terminal and spaced from the top of the cell, the top portion of said can being inwardly retroverted to define with said washer an annular expansion chamber, and sealing material on said washer between the retroverted top portion of said can and said rod terminal in sealing engagement therewith.

8. In a dry cell, a cylindrical metal can, a central terminal within said can and exposed at the top of the cell, a flat washer of non-conducting material spaced from the top of the cell and extending radially from said central terminal toward said can, a cylindrical partition arranged upon said washer coaxially with said can and intermediate said central terminal and said can, an annular closure extending over the space above said washer and between said can and said partition to form an expansion chamber, and a body of sealing material substantially filling and confined to the space above said washer and between said partition and said central terminal in sealing engagement therewith.

9. In a dry cell, an integral metal can having a top portion and a body portion, a central terminal within said can and exposed at the top of the cell, a flat washer of non-conducting material spaced from the top of the cell and extending radially from said central terminal toward said can, said top portion of said can extending inwardly at the top of the cell to a location intermediate said central terminal and said body portion of said can and thence extending downwardly to said washer, and a body of sealing material upon said washer and confined between said central terminal and the town-turned portion of said top portion of said can in sealing engagement therewith, said inwardly extending portion of the top of the can being exposed to the atmosphere as an annular surface surrounding the top surface of said body of sealing material.

ARTHUR W. SIMPSON.

(References on following page)

REFERENCES CITED

The following references are of record in the file of this patent:

UNITED STATES PATENTS

| Number | Name | Date |
|---|---|---|
| 454,598 | Hathaway | June 23, 1891 |
| 1,203,279 | Tarver | Oct. 31, 1916 |
| 1,487,728 | De Olaneta | Mar. 25, 1924 |
| 1,764,770 | Andre | June 17, 1930 |
| 1,866,016 | Deibel | July 5, 1932 |
| 2,060,799 | Drummond | Nov. 17, 1936 |
| 2,079,495 | Deibel | May 4, 1937 |
| 2,179,816 | Drummond | Nov. 14, 1939 |
| 2,399,089 | Anthony | Apr. 23, 1946 |
| 2,463,454 | Birdsall | Mar. 1, 1949 |
| 2,490,598 | Oliver | Dec. 6, 1949 |

FOREIGN PATENTS

| Number | Country | Date |
|---|---|---|
| 173,515 | Great Britain | Aug. 31, 1922 |